2,996,483
VULCANIZABLE RUBBER COMPOSITION AND METHOD OF VULCANIZING RUBBER

Lloyd O. Bentz, Lancaster, Pa., and George E. P. Smith, Jr., Akron, Ohio, assignors to The Firestone Tire & Rubber Company, Akron, Ohio, a corporation of Ohio
No Drawing. Original application Dec. 31, 1956, Ser. No. 631,421. Divided and this application May 11, 1959, Ser. No. 817,702

6 Claims. (Cl. 260—79.5)

This invention relates to some unique members of a new class of benzothiazole sulfenamides and to the application of these substances to accelerating the vulcanization of rubber.

During recent years the channel carbon blacks have been increasingly replaced by the newer fine furnace blacks in pneumatic tire tread compositions. The new furnace blacks, designed HAF, ISAF and SAF blacks, have become so popular because they impart much longer tread life to tires than did the channel blacks. Whereas the channel blacks were acidic in reaction, the new furnace blacks are alkaline, displaying pH values above 7.0. Perhaps partly because of their alkalinity the new furnace blacks have been difficult to handle in modern high speed rubber processing equipment, because they tend to make rubber stocks "scorchy," the stocks tending to set up or pre-cure before the end of the mechanical working of the stocks during processing in Banbury mixers, mills, calenders and extruders. A scorched stock, of course, must be scrapped.

It is an object of the present invention to provide a new class of vulcanization accelerators comprising benzothiazole sulfenamides possessing unique and valuable rubber vulcanization accelerating characteristics. It is also an object to provide improved rubber compositions free from tendency to scorch during factory processing operations. A further object is to provide an improved method of manufacturing furnace black reinforced rubber compositions. The above and further objects will become apparent in the description of the invention which follows. The objects of the invention are realized by the successful preparation of a new group of closely related benzothiazole sulfenamides and the employment of these new compounds as accelerators of rubber vulcanization. The novel compounds, the benzothiazole sulfenamides of tertiary alicyclic primary amines can be prepared in accordance with the following examples.

EXAMPLE 1

Reactants 5.6 grams (0.033 mole) 2-mercaptobenzothiazole
6.7 grams (0.17 mole) sodium hydroxide in 70 ml. water
20 grams (0.133 mole) 1-methylcyclohexylamine hydrochloride
25 ml. ethanol
22.5 ml. 1.69 molar sodium hypochlorite (containing 0.038 mole sodium hypochlorite)

Conditions

The mercaptobenzothiazole was dissolved in the sodium hydroxide solution, and the amine hydrochloride was added. The resulting two phase liquid mixture was made homogeneous by stirring in the ethanol. Thereafter, the solution was stirred at 25–27° C. during addition of the hypochlorite solution gradually over a period of 55 minutes. After an additional 15 minutes of stirring the reaction mixture was filtered. The white crystals, which were so separated, were washed and air-dried.

Result

Yield of 46% N-(1methylcyclohexyl)-2-benzothiazole sulfenamide, of the formula

Melting at 104–105° C.

Chemical analysis:
Found: 10.23% nitrogen; 22.75% sulfur.
Calculated: 10.06% nitrogen; 23.04% sulfur.

EXAMPLE 2

Reactants 5.6 grams (0.033 mole) 2-mercaptobenzothiazole
1.33 grams (0.033 mole) sodium hydroxide in 50 ml. water
13.2 grams (0.133 mole) 1-methylcyclopentylamine
22 ml. 1.69 molar sodium hypochlorite (containing 0.037 mole sodium hypochlorite)

Conditions

The mercaptobenzothiazole and the amine were dissolved in the sodium hydroxide solution. Then the hypochlorite solution was gradually added, with stirring, over a period of 45 minutes. After an additional 30 minutes of stirring, the crystalline product was separated from the reaction mixture by filtration and then was washed and air-dried.

Result

Yield of 68% N-(1-methylcyclopentyl)-2-benzothiazole sulfenamide, of the formula Melting at 72–74° C.

Chemical analysis:
Found: 10.76% nitrogen; 24.08% sulfur.
Calculated: 10.60% nitrogen; 24.26% sulfur.

In a similar manner 1-ethylcyclopentylamine or 1-ethylcyclohexylamine can be condensed with a 2-mercaptothiazole to produce the analogous sulfenamide.

The sulfenamides of Examples 1 and 2 were tested as rubber vulcanization accelerators in a natural rubber tire tread stock reinforced by a commercial super-fine furnace black, the formulas being set out in Table 1, all parts being by weight.

TABLE 1

| Ingredients | A | B |
|---|---|---|
| Rubber (smoked sheets) | 100 | 100 |
| HAF carbon black | 50 | 50 |
| Zinc oxide | 3 | 3 |
| Refined pine gum (softener) | 3 | 3 |
| Stearic acid | 2.6 | 2.6 |
| Antioxidant | 1.8 | 1.8 |
| Sulfur | 2.6 | 2.6 |
| Product of Example 1 | 0.5 | |
| Product of Example 2 | | 0.5 |

Table 2 shows the results of the Mooney Scorch tests, made at 265° F., in accordance with the article by R. Shearer, A. E. Juve and J.H. Musch, India Rubber World, volume 117, pages 216–219 (1947). The test results are in minutes, and values of 20 minutes or more indicate that the rubber stock is not scorchy.

TABLE 2

| Rubber Composition | A | B |
|---|---|---|
| Initial scorch | 20 | 20 |
| 10 Point rise | 26 | 25 |

Table 3 sets out the normal physical properties of the stocks cured at 280° F., and Table 4 shows physical properties of stocks after aging 2 days at 212° F. The modulus and tensile results are expressed as pounds per square inch (p.s.i.).

TABLE 3

| Normal Properties of Stocks | A | B |
|---|---|---|
| Modulus @ 300%: | | |
| 30′ Cure | 1,400 | 1,425 |
| 45′ Cure | 1,750 | 1,775 |
| 60′ Cure | 1,900 | 1,950 |
| 90′ Cure | 2,100 | 2,050 |
| Modulus @ 400%: | | |
| 30′ Cure | 2,350 | 2,375 |
| 45′ Cure | 2,850 | 2,850 |
| 60′ Cure | 3,000 | 3,000 |
| 90′ Cure | 3,275 | 3,150 |
| Tensile strength: | | |
| 30′ Cure | 3,850 | 3,675 |
| 45′ Cure | 3,975 | 3,950 |
| 60′ Cure | 3,875 | 3,875 |
| 90′ Cure | 3,675 | 3,775 |
| Elongation (percent): | | |
| 30′ Cure | 560 | 530 |
| 45′ Cure | 520 | 510 |
| 60′ Cure | 490 | 490 |
| 90′ Cure | 450 | 460 |

TABLE 4

| Aged Properties of Stocks | A | B |
|---|---|---|
| Modulus @ 300%: | | |
| 30′ Cure | 1,575 | 1,575 |
| 45′ Cure | 1,825 | 1,800 |
| 60′ Cure | 1,950 | 1,925 |
| 90′ Cure | | 2,125 |
| Modulus @ 400%: | | |
| 30′ Cure | 2,450 | 2,450 |
| 45′ Cure | 2,725 | |
| 60′ Cure | | |
| 90′ Cure | | |
| Tensile strength: | | |
| 30′ Cure | 2,800 | 2,950 |
| 45′ Cure | 2,725 | 2,400 |
| 60′ Cure | 2,300 | 2,000 |
| 90′ Cure | 1,900 | 2,125 |
| Elongation (percent): | | |
| 30′ Cure | 435 | 455 |
| 45′ Cure | 400 | 375 |
| 60′ Cure | 340 | 315 |
| 90′ Cure | 270 | 300 |

The above data show that the novel sulfenamides of the examples are excellent delayed-action accelerators, producing natural rubber tire treads having high physical properties, which are substantially maintained after the drastic aging treatment of 2 days in air at 212° F. Table 2 shows that the usually scorchy furnace black natural rubber tread stocks were not scorchy when accelerated by the sulfenamides of the invention. Therefore, the new sulfenamides make it possible to utilize the superior reinforcing furnace blacks in natural rubber, without the usual danger of ruining the stocks by scorching during tread extrusion and other processing steps.

The sulfenamides of the invention are valuable accelerators for the vulcanization of all sulfur-vulcanizable synthetic rubbers, including for example the "synthetic natural rubbers," rubbery butadiene-styrene copolymers, rubbery butadiene-acrylonitrile copolymers, rubbery polyisoprenes and polybutadienes. For example, the sulfenamide of Example 2 was tested as an accelerator in a tire tread formula based upon LTP GR-S (a rubbery butadiene-styrene copolymer produced at approximately 40° F. by aqueous emulsion polymerization) which rubber contains approximately 1.25 percent of phenyl-beta-naphthylamine as a stabilizer and antioxidant. The tread formula is given in Table 5, normal physical properties on cures at 280° F. are shown in Table 6 and properties after the vulcanized stocks were aged in air for 2 days at 212° F. are given in Table 7. The numerical values are as in the corresponding earlier tables herein.

TABLE 5

| Ingredients: | C |
|---|---|
| LTP GR-S | 100 |
| HAF carbon black | 48 |
| Processing oil | 8 |
| Zinc oxide | 3 |
| Stearic acid | 2 |
| Phenyl-beta-naphthylamine | 0.6 |
| Sulfur | 2.0 |
| Product of Example 2 | 1.2 |

TABLE 6

| Normal properties of stock: | C |
|---|---|
| Modulus @ 300%— | |
| 30′ cure | No cure |
| 45′ cure | No cure |
| 60′ cure | 1026 |
| 90′ cure | 2050 |
| Modulus @ 400%— | |
| 30′ cure | No cure |
| 45′ cure | No cure |
| 60′ cure | 1650 |
| 90′ cure | 3075 |
| Tensile strength— | |
| 30′ cure | No cure |
| 45′ cure | No cure |
| 60′ cure | 3275 |
| 90′ cure | 3525 |
| Elongation (percent)— | |
| 30′ cure | No cure |
| 45′ cure | No cure |
| 60′ cure | 650 |
| 90′ cure | 455 |

TABLE 7

| Aged properties of stock: | C |
|---|---|
| Modulus @ 300%— | |
| 60′ cure | 3275 |
| 90′ cure | |
| Tensile strength— | |
| 60′ cure | 3475 |
| 90′ cure | 2400 |
| Elongation (percent)— | |
| 60′ cure | 320 |
| 90′ cure | 215 |

The accelerators of the invention are effective in combination with either free sulfur or with a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including the dialkylamine polysulfides, heterocyclic amine polysulfides and reaction products of primary amines with excess sulfur. Only a relatively small proportion of the accelerators of the invention are required, on the order of 0.1% to 10% of the weight of the rubber employed.

Although the fine furnace blacks (of the high abrasion type) are generally employed in a loading of 40 to 70 parts per hundred of rubber (phr.), they have value as a reinforcing agent in the range of 5 to 100 phr. Ordinary vulcanizing temperatures are contemplated by the invention, preferably in the range of 260° to 400° F.

This application is a division of application Serial Number 631,421, filed Dec. 31, 1956.

What is claimed is:

1. Method of vulcanizing rubber comprising heating a sulfur-vulcanizable diene rubber and sulfur in admixture with 0.1% to 10% of the weight of the rubber of a sulfenamide of the class consisting of N-(1-methylcyclohexyl)-2-benzothiazole sulfenamide and N-(1-methylcyclopentyl)-2-benzothiazole sulfenamide.

2. Method of vulcanizing rubber comprising heating a sulfur-vulcanizable diene rubber and sulfur in admixture with 0.1% to 10% of the weight of the rubber of N-(1-methylcyclohexyl)-2-benzothiazole sulfenamide.

3. Method of vulcanizing rubber comprising heating a sulfur-vulcanizable diene rubber and sulfur in admixture with 0.1% to 10% of the weight of the rubber of N-(1-methylcyclopentyl)-2-benzothiazole sulfenamide.

4. A vulcanizable composition comprising a sulfur-vulcanizable diene rubber, sulfur and 0.1% to 10% of the weight of the rubber of a sulfenamide of the class consisting of N-(1-methylcyclohexyl)-2-benzothiazole sulfenamide and N-(1-methylcyclopentyl)-2-benzothiazole sulfenamide.

5. A vulcanizable composition comprising a sulfur-vulcanizable diene rubber, sulfur and 0.1% to 10% of the weight of the rubber of N-(1-methylcyclohexyl)-2-benzothiazole sulfenamide.

6. A vulcanizable composition comprising a sulfur-vulcanizable diene rubber, sulfur and 0.1% to 10% of the weight of the rubber of N-(1-methylcyclopentyl)-2-benzothiazole sulfenamide.

References Cited in the file of this patent

UNITED STATES PATENTS

| | | |
|---|---|---|
| 2,382,793 | Howland | Aug. 14, 1945 |
| 2,814,208 | Smith | July 4, 1950 |